Nov. 4, 1930.  F. GOLDBECHER  1,780,706
AUTOMOBILE TABLE
Filed Feb. 12, 1929  3 Sheets-Sheet 1
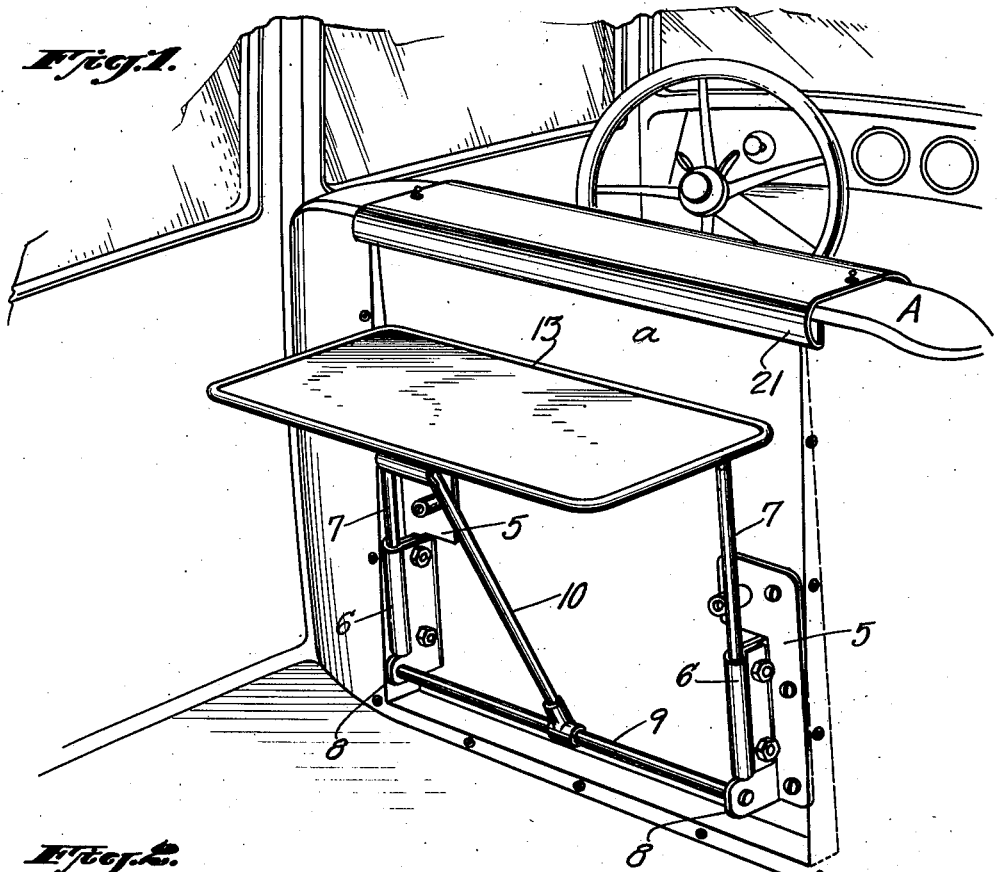
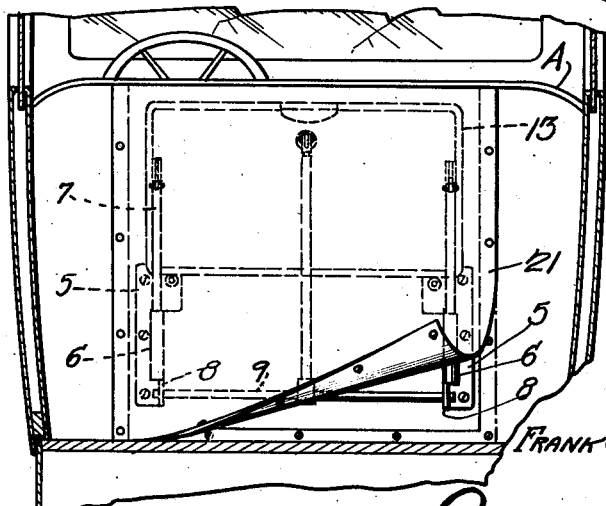
Inventor
FRANK GOLDBECHER.
By Clarence A. O'Brien
Attorney

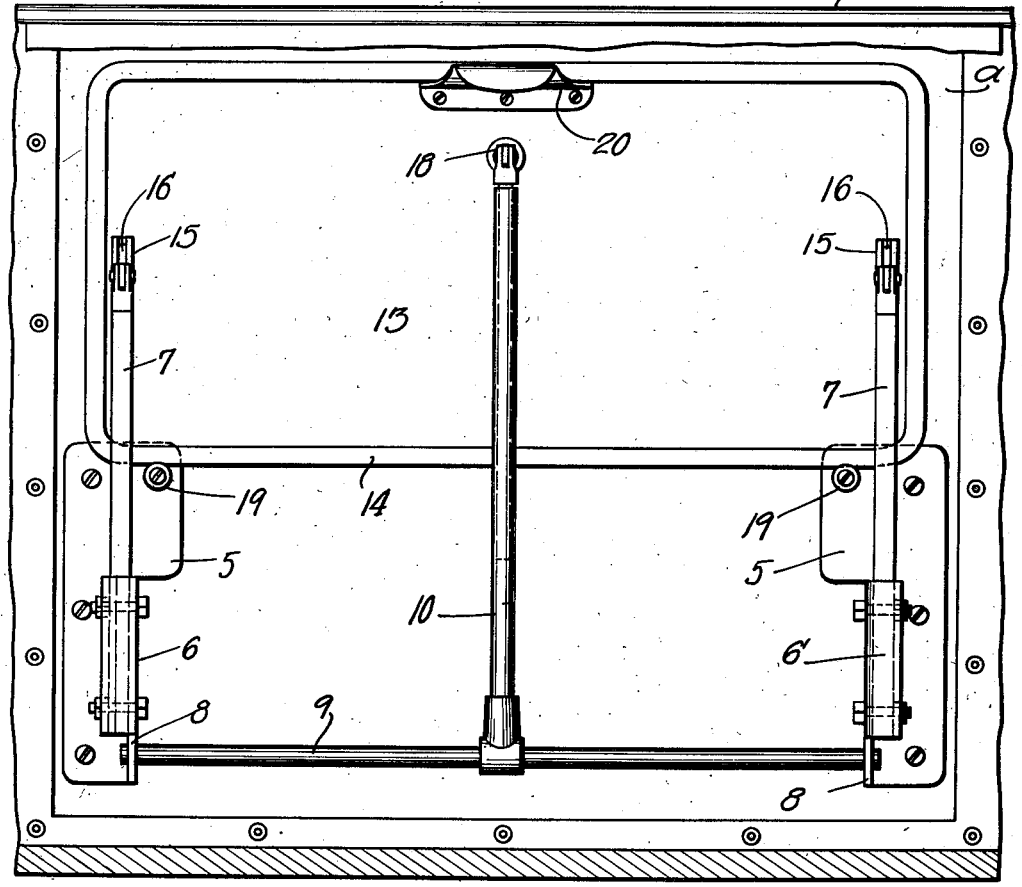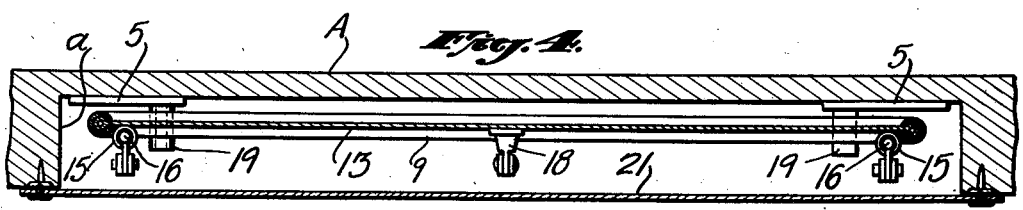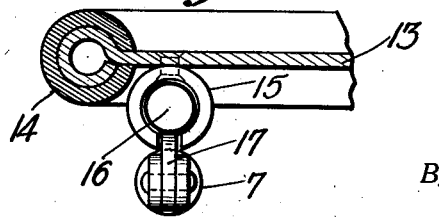

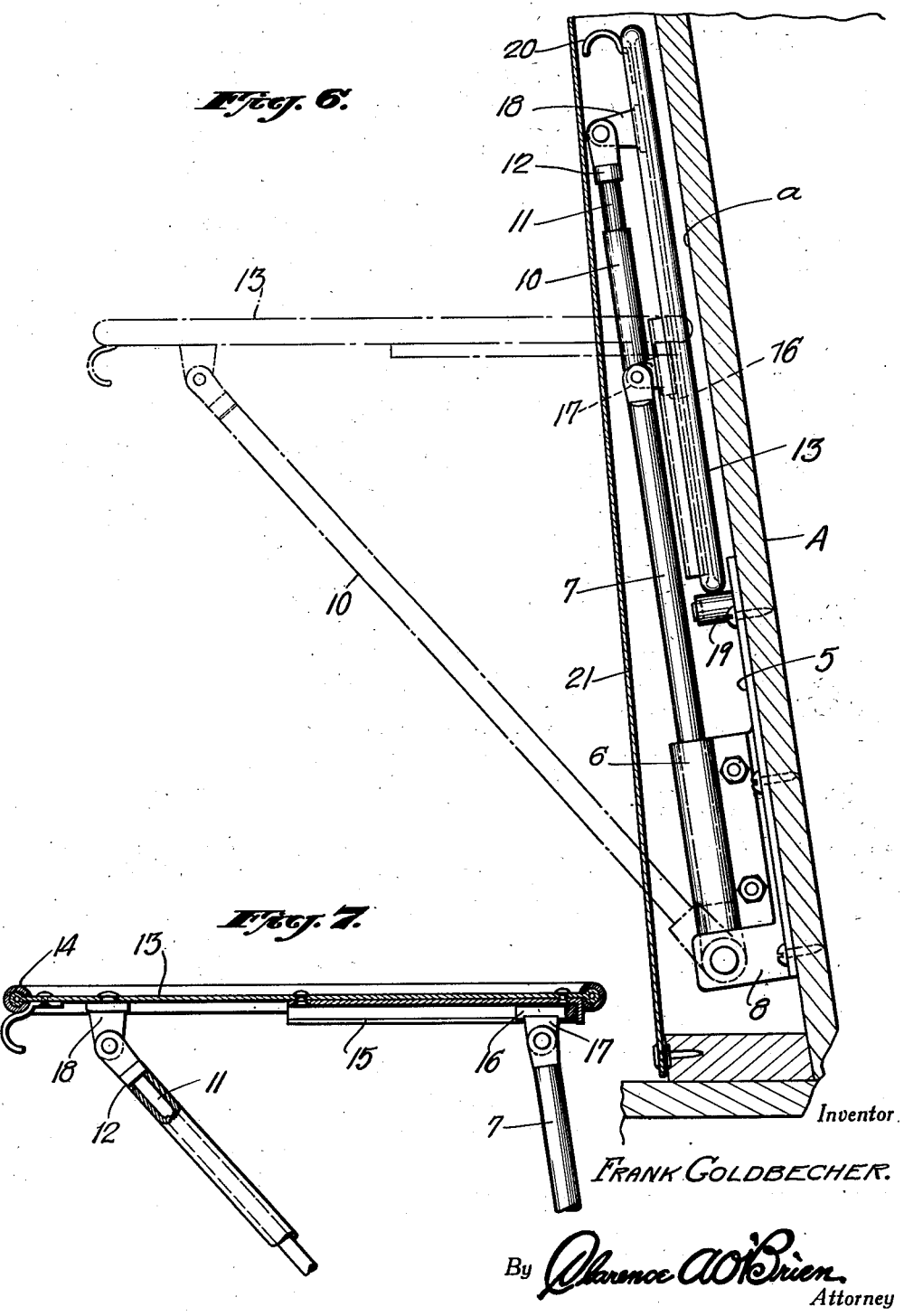

Patented Nov. 4, 1930

1,780,706

UNITED STATES PATENT OFFICE

FRANK GOLDBECHER, OF GRANTWOOD, NEW JERSEY

AUTOMOBILE TABLE

Application filed February 12, 1929. Serial No. 339,415.

This invention relates to new and useful improvements in tables for automobiles, and aims to provide a novel, simple and useful table construction that may be readily associated with the back of the front seat structure of an automobile or to any other convenient place within the machine, and provides a useful device to enable the occupants of the car to play cards, spread a lunch or to use the same as a writing desk or the like.

An important object of this invention is to provide a table of this character that when not in use may be readily folded up in attached relation with the interior of the car, so as to be entirely out of the way when not in use. Furthermore, the structural details of the device are such that the table board will be rigidly supported when arranged in horizontal position for use. In addition to this, the device may be arranged within an open pocket formed in the rear face of the back of the front seat structure in the machine, or it may be attached directly to said back or to any convenient point within the machine without in any manner whatever, altering the construction of the machine.

With the foregoing and other objects in view, as the nature of this invention will be better understood from the following specification when considered in conjunction with the accompanying drawings, wherein:

Figure 1 is a perspective of my table structure arranged within a preformed pocket in the back of the front seat of an automobile, the table being disclosed in position for use.

Figure 2 is a transverse section through a conventional automobile body directly in back of the front seat structure and looking towards the seat, which is equipped with my improved table.

Figure 3 is an enlarged elevation of the table in folded condition, and as associated with the back of the front seat of the machine.

Figure 4 is a detailed horizontal section through the back of the front seat, and through my table structure folded within the pocket of the front seat back, which pocket is closed by a suitable apron or curtain attached to the seat.

Figure 5 is a fragmentary horizontal section through one end of the table board.

Figure 6 is a vertical section through the front seat back at one end of the table structure, which is disclosed in folded end elevation, the dotted lines indicating the position of the table units when it is extended outwardly for use, and Figure 7 is a detailed transverse section through the table board at one end thereof, disclosing one of the slidable connections between the underside of the table board, and one of the end brace legs therefor.

Now having particular reference to the drawings, my novel device consists of a pair of plate like brackets 5—5 that are formed with a plurality of openings in order that they may be secured in flush engagement to the back A of the front seat of an automobile, or within a pocket a formed within said back, if it is desired that the table unit be disposed entirely within the seat back when not in use. However, the provision of the pocket is not necessary, as the arrangement can be advantageously associated with the outer surface of the back of front seats of automobiles already in use. As a matter of fact, if desired, the device could be associated with the inner faces of the doors of the automobile body. I do not desire to be limited to the attachment of my arrangement to any particular place within a motor vehicle body, nor do I desire to be limited to the use of the device in association with an automobile, as it could be set up in railway coaches, aeroplanes or within the home. These pockets 5 are formed or equipped with outwardly projecting sleeves or collars 6—6, within which are secured the lower ends of upwardly extending table board brace bars 7—7.

At the lower ends of these sleeves or collars 6—6 are outwardly projecting ears 8—8 having registering openings for the reception of the ends of a cross bar 9. Pivoted to this cross bar 9 at its center is an upwardly extending hollow table board brace bar 10, within which is telescopically arranged a solid bar 11, having an abutment 12, adjacent its upper end to limit its inward sliding movement within the hollow bar 10.

The invention further contemplates the provision of a table board 13 of suitable size and design, the edges thereof being preferably beaded and cushioned as at 14. Upon the underside of this table board 5 adjacent its opposite ends and extending from the rear edge thereof are tubular guide members 15—15, longitudinally slotted at their bottom sides, and within which are slidable pins 16—16. These pins are formed with depending ears 17 that are loosely pivoted to the upper ends of said table board brace bars 7—7. Located upon the underside of the table board 13 adjacent its forward edge and at its center is a depending ear 18, that is loosely pivotally secured to the upper end of the solid bar 11 slidable within the hollow bar 10. Obviously therefore, when the table board 13 is in folded out of the way position, as disclosed more clearly in Figures 3, 4 and 6, it is only necessary to draw upwardly upon the board until the ends of said sliding pins 16 reach the inner ends of the channel members 15—15. The board can then be enabled to drop downwardly to substantially a horizontal position as shown by the full lines in Figures 1, 3 and 7 and the dotted lines in Figure 6.

It will be rigidly supported in this position by reason of the forward brace bar 10, and the pair of rear bars 7—7.

If desired, suitable bumpers 19—19 may be associated with the bracket plates 5—5 adjacent their upper ends and against which the inner edge of the table will strike and rest when it is folded inwardly. The forward edge of the table board may be and preferably is equipped at its center with a handle member 20, to facilitate the opening and closing of the table.

In the event the structure is arranged within a pocket as disclosed in the drawings, a strip of curtain material 21 may be associated at one end with the seat back at the upper end of the pocket, while arranged around the pocket may be members of operable fasteners, the other members thereof being associated with the curtain to enable the curtain to be secured in position over the pocket, as illustrated in Figures 2, 4 and 6, which will of course, protect the arrangement from dirt and dust, and also to maintain the same out of view when not in use.

In view of the foregoing description when considered in conjunction with the accompanying drawings, it will be apparent that I have provided a novel, simple and useful folding table that is well adapted for all of the purposes heretofore designated, and even though I have herein shown and described the invention as consisting of certain detailed structural elements, it is nevertheless to be understood that some changes may be made, without affecting the spirit and scope of the appended claims.

Having thus described my invention, what I claim as new, and desire to secure by Letters-Patent, is:

1. In a table unit of the character described, a pair of bracket members adapted to be secured to a support, supporting bars attached at their lower ends to said brackets, a cross member arranged between the brackets beneath said supporting bars, a further bar pivoted at its lower end to said cross member, a table board, slidable and pivotal connections between the board and the upper ends of said first mentioned bars, a slidable and pivotal connection between said board and the upper end of said pivoted bar, said first mentioned slidable and pivotal connections in each instance consisting of a channel member associated with the table board, a pin slidable therein, and a member carried by said pin for pivotal attachment to the upper end of the adjacent bar.

2. In a table unit of the character described, a pair of bracket members adapted to be secured to a support, supporting bars attached to said bracket members, a cross member arranged between the bracket members, a prop bar pivoted to said cross member, a table board, slidable and pivotal connections between the board and said supporting bars, a slidable and pivotal connection between said board and said prop bar, said first mentioned slidable and pivotal connections in each instance consisting of a channel member associated with the table board, a pin slidable therein, and a member carried by said pin for pivotal attachment to the upper end of the adjacent bar.

3. In a table unit of the character described, a pair of bracket members adapted to be secured to a support, supporting bars supported by said bracket members, a cross member having its end supported by said bracket members and bridging the space therebetween, a telescoping prop bar pivoted to said cross member, a table board, slidable and pivotal connections between said table board and said supporting bars, each of said slidable and pivotal connections including a slotted tubular member fixed to the underside of said table board, a pin slidable within said slotted tubular member, an ear extending from said pin and passing through the slot in said slotted tubular member to which the upper end of a supporting bar is pivotally connected, and a pivotal connection between said telescoping prop bar and the underside of said table board.

In testimony whereof I affix my signature.

FRANK GOLDBECHER.